United States Patent [19]

Kimura

[11] Patent Number: 5,760,994
[45] Date of Patent: Jun. 2, 1998

[54] RECORDING OR REPRODUCING APPARATUS

[75] Inventor: Takashi Kimura, Kanagawa-ken, Japan

[73] Assignee: Canon Kabushiki Kaisha, Tokyo, Japan

[21] Appl. No.: 259,139

[22] Filed: Jun. 13, 1994

Related U.S. Application Data

[63] Continuation of Ser. No. 824,204, Jan. 22, 1992, abandoned.

[30] Foreign Application Priority Data

Jan. 23, 1991 [JP] Japan .................. 3-006396
Apr. 16, 1991 [JP] Japan .................. 3-084064

[51] Int. Cl.⁶ .................................................. G11B 15/66
[52] U.S. Cl. .................................. 360/85; 360/130.32
[58] Field of Search ........................ 360/85, 84, 130.3, 360/130.31, 130.32, 130.22; 242/197, 198, 199, 200

[56] References Cited

U.S. PATENT DOCUMENTS

| | | | |
|---|---|---|---|
| 3,943,566 | 3/1976 | Brock et al. | 360/84 |
| 4,410,919 | 10/1983 | Umeda | 360/85 |
| 4,665,450 | 5/1987 | Hirano | 360/85 |
| 4,796,115 | 1/1989 | Oshima et al. | 360/85 |
| 5,036,411 | 7/1991 | Hosoya et al. | 360/85 |
| 5,124,862 | 6/1992 | Sawano et al. | 360/85 |

*Primary Examiner*—Stuart S. Levy
*Assistant Examiner*—George J. Letscher
*Attorney, Agent, or Firm*—Robin, Blecker & Daley

[57] ABSTRACT

A recording or reproducing apparatus having a rotary drum which is provided with heads and an impedance roller which suppresses the vibrations of a tape wrapped around the rotary drum is arranged to have the impedance roller located between the rotary drum and at least one of the posts which are located immediately before and after the rotary drum in a tape path formed when the tape is loaded on the apparatus. Further, the impedance roller and a member such as a slanting post are arranged on a moving member in such a way as to have their slanting directions or positions individually adjustable, so that the tape can be allowed to travel in an adequate state for accurate recording or reproduction of the information.

22 Claims, 6 Drawing Sheets

RECORDING OR REPRODUCING APPARATUS

This is a continuation of prior application Ser. No. 07/824,204, filed Jan. 22, 1992, now abandoned.

BACKGROUND OF THE INVENTION

1. Field of the Invention

This invention relates to a recording or reproducing apparatus and more particularly to a recording or reproducing apparatus having an impedance roller arranged to suppress vibrations of a tape-shaped recording medium.

2. Description of the Related Art

The magnetic recording or reproducing apparatus (hereinafter referred to as the VTR) of the kind arranged to record or reproduce a video signal by wrapping a magnetic tape around a rotary drum (hereinafter referred to as a drum) on which heads are mounted has various problems. One of the problems lies in the time base fluctuations of a reproduced signal called jitters. There are many conceivable causes for jitters. The typical causes include uneven rotation of the drum, the fluctuations of speed of the tape, etc. The vibrations of the tape due to the so-called beats of the head which arise when the head abuts on the tape also have become a great cause for jitters, because the number of heads has increased as a result of a recent increase in recording density.

Figure 1:
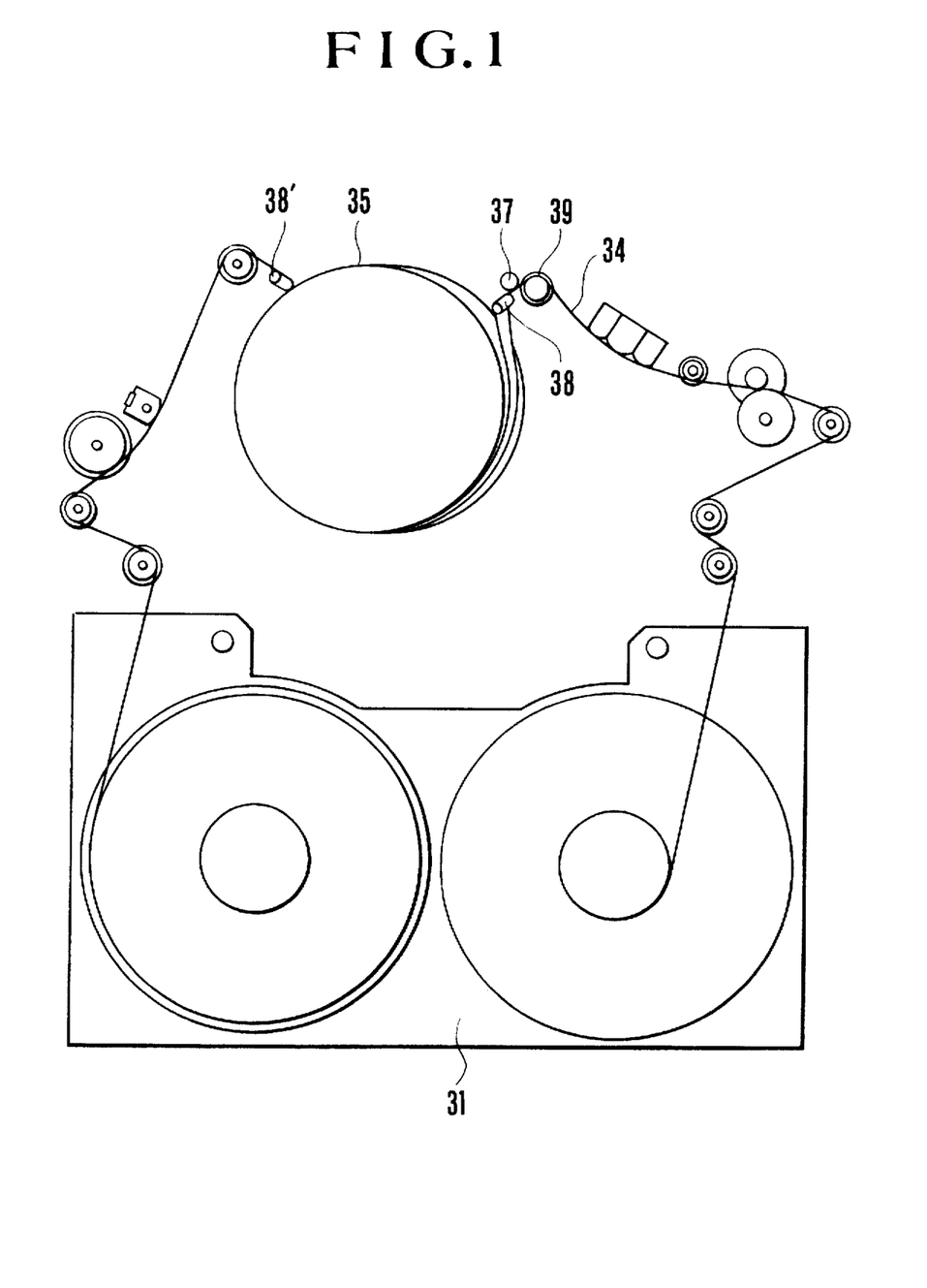
FIG. 1 shows a tape path of the conventional VTR.

A method generally employed for preventing such vibrations of the tape is as follows: referring to FIG. 1 of the accompanying drawings, a roller 37 (hereinafter referred to as an impedance roller) of a large mass which is erected on a chassis which is not shown is arranged to be located between a main slanting post 38 and a vertical post 39 when the tape is loaded. The impedance roller 37 is arranged to absorb the vibrations of the tape 34 by abutting on the tape 34.

The vibrations of the tape due to the beats of the head can be most effectively absorbed by disposing the impedance roller 37 nearest to the source of vibrations, that is, immediately before or after the drum. In the case of a tape loading method as shown in FIG. 1, however, it is extremely difficult in terms of space to erect and dispose the impedance roller 37 between the drum 35 and the main slanting post 38 or 38' which is located immediately before or after the drum 35. Even if it is possible to have the impedance roller 37 in that position, there is hardly enough space for allowing the impedance roller 37 to have a sufficient mass. Further, it is necessary to have a certain length of the tape between the drum 35 and the impedance roller 37 with the latter located in that position. The path of the tape thus extends more opposite to a tape cassette 31. Then, in order to adequately form the tape path, the drum 35 must be greatly slanted. Further, a larger area becomes necessary for the tape path to cause an increase in size of the apparatus.

SUMMARY OF THE INVENTION

This invention is directed to the solution of the above-stated problems. It is, therefore, a first object of the invention to provide an apparatus which is capable of accurately recording or reproducing information.

It is a second object of the invention to provide a recording or reproducing apparatus which is arranged to permit an impedance roller of a sufficiently large mass to be disposed as near to a drum as possible.

To attain the above-stated object, a recording or reproducing apparatus having a rotary drum on which heads are mounted and an impedance roller which suppresses the vibrations of a tape wrapped around the rotary drum is arranged according to this invention to have the impedance roller to come to abut on the tape from inside of the path of the tape after completion of tape loading on the drum.

The impedance roller is further arranged to be located between the rotary drum and at least one of the posts which are located immediately before and immediately after the rotary drum in the tape path when the tape is loaded.

The impedance roller is also arranged to move in association with the tape loading action during the process of tape loading.

Further, the impedance roller is erected on a skate together with a slanting post provided for wrapping the tape around the rotary drum and is arranged to move with the skate to a given position in loading the tape.

It is a third object of the invention to provide a recording or reproducing apparatus which is arranged to permit adjustment work individually on the direction or position of each of the members such as the impedance roller and a slanting post or the like disposed on a moving member for the purpose of more effectively attaining the first object mentioned above.

To attain the third object, a recording or reproducing apparatus having a movable member arranged to movably carry posts which are provided for forming a tape path in loading a tape on the apparatus by wrapping the tape around a rotary drum on which heads are mounted is arranged as an embodiment of the invention to comprise a plurality of slanting posts disposed on the above-stated movable member; and an adjustment part arranged to permit adjustment work individually on the directions or positions of the plurality of posts. Therefore, in a case where an impedance roller and a slanting post are mounted in combination on the movable member and arranged to be movable toward the entrance side or exit side of the rotary drum, the tape can be allowed to travel in an adequate state by adjusting the slanting directions or positions of the impedance roller and the slanting post.

These and other objects and features of the invention will become more apparent from the following detailed description of an embodiment thereof taken in connection with the accompanying drawings.

DETAILED DESCRIPTION OF THE PREFERRED EMBODIMENT

Figure 2:
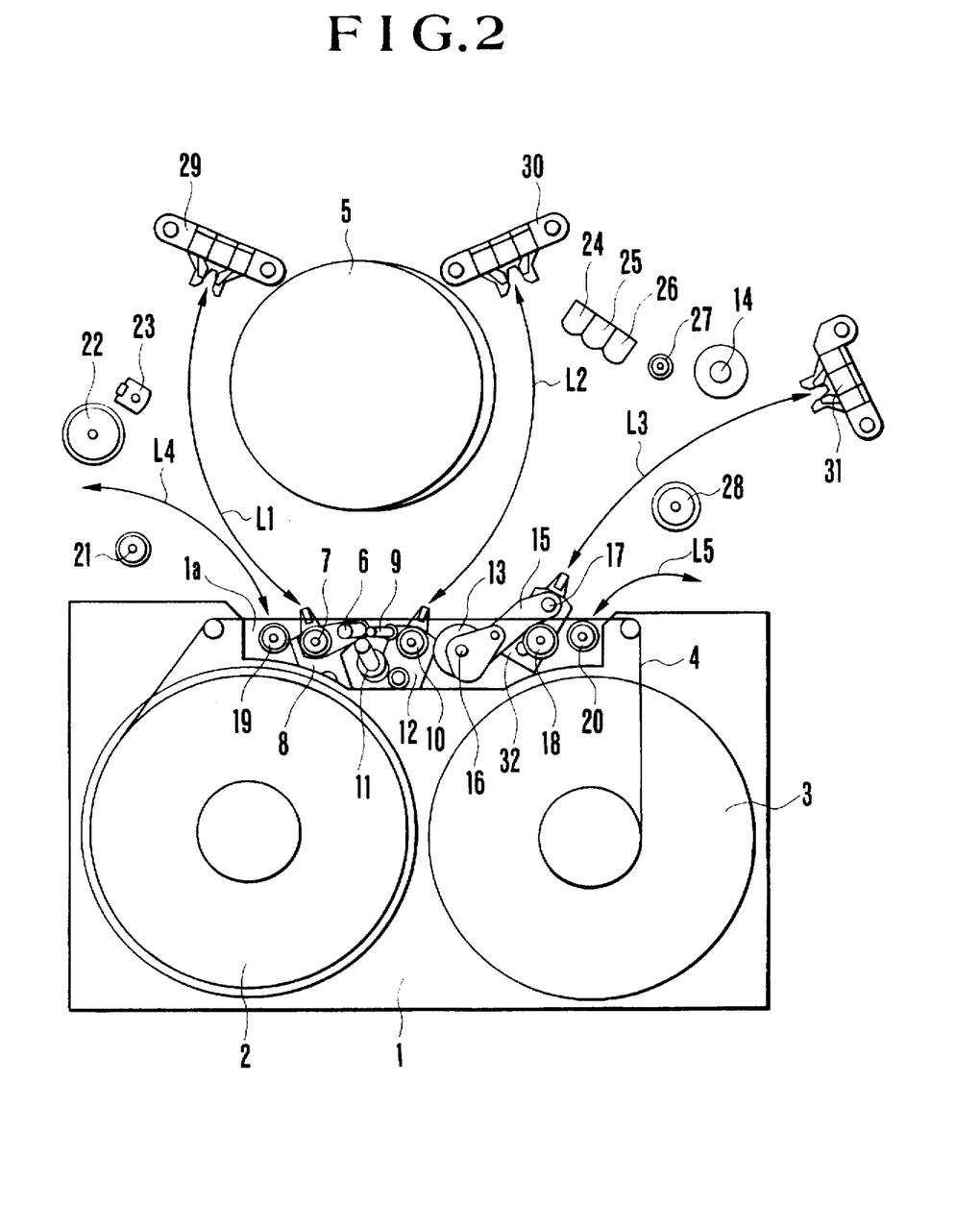
FIG. 2 shows the arrangement of posts in an unloading state obtained in a VTR which is arranged according to this invention as an embodiment thereof.
Figure 3:
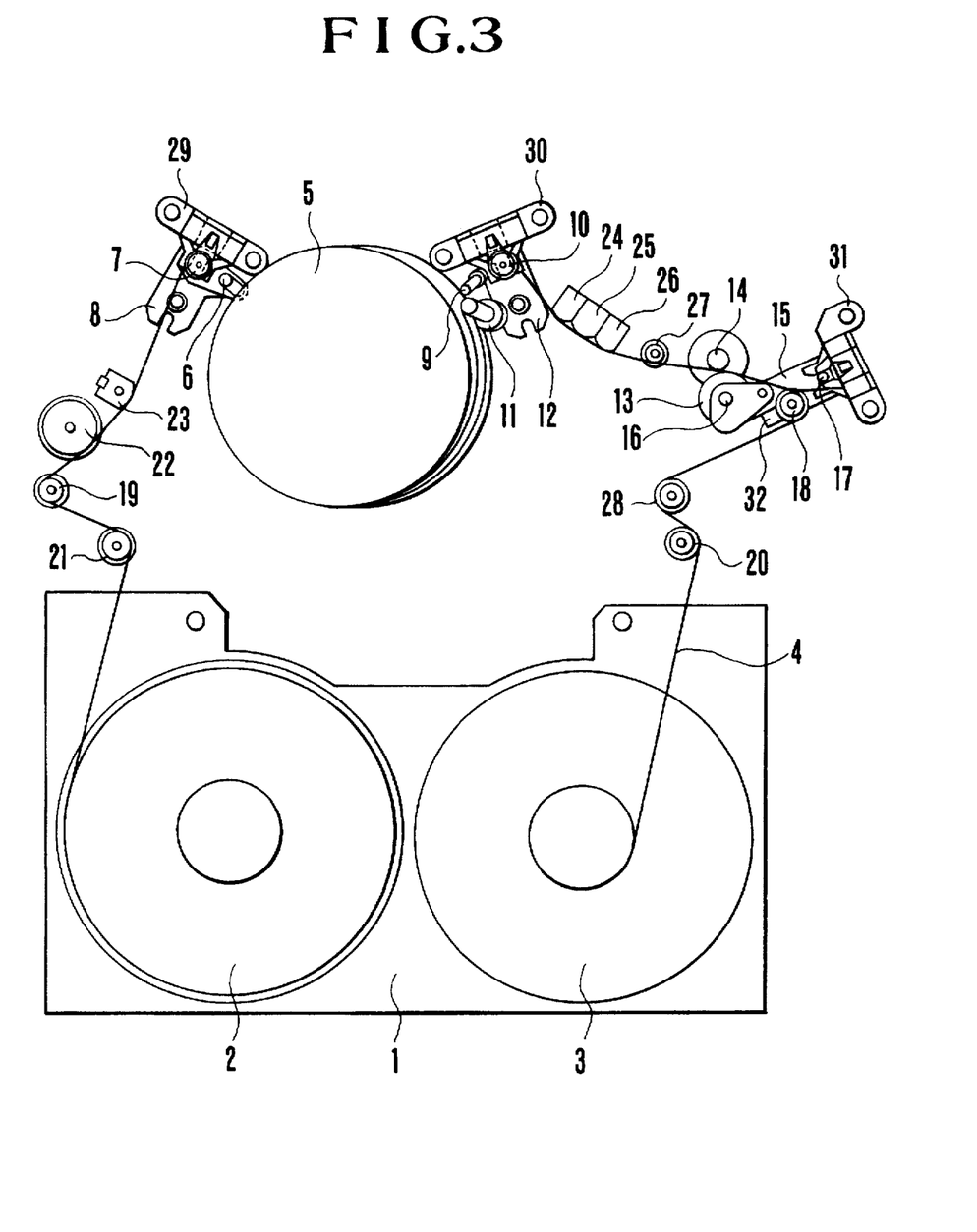
FIG. 3 shows the arrangement of posts in a loading state in the VTR arranged as the embodiment.

An embodiment of this invention is described below with reference to the accompanying drawings:

FIGS. 2 and 3 show a tape path formed by a VTR which is arranged as an embodiment of this invention. The tape path is shown in an unloading state in FIG. 2 and in a loading state in FIG. 3. In loading the tape, all moving posts move in parallel to a datum plane to have a tape wrapped around a rotary drum almost symmetrically on the right and left sides of the drum in a manner called an M loading method.

Referring to FIGS. 2 and 3, a tape 4 is wound on a supply reel 2 and a take-up reel 3 within a cassette 1. These reels 2 and 3 are engaging respectively supply-side and take-up-side reel tables which are not shown. The rotary drum 5 on which magnetic heads (not shown) are mounted is slanting to a given degree in the direction of nine o'clock. An entrance-side slanting post 6 is provided for defining the incoming direction of the tape 4 relative to the rotary drum 5. An entrance-side vertical post 7 is provided for defining the height of the tape 4 on the entrance side of the rotary drum 5. Both the posts 6 and 7 are erected on an entrance-side skate 8 which is arranged to be movable in the directions of arrow L1. An exit-side slanting post 9 is provided for defining the outgoing direction of the tape 4 from the rotary drum 5. An exit-side vertical post 10 is provided for defining the height of the tape 4 on the exit side of the rotary drum 5. A reference numeral 11 denotes an impedance roller which is an essential part of this invention. The impedance roller 11 is erected via a shaft 33 on an exist-side skate 12 which is arranged to be movable in the directions of arrow L2. The details of the impedance roller 11 will be described later herein. The posts 9 and 10 are erected also on the exit-side skate 12.

Figure 4:
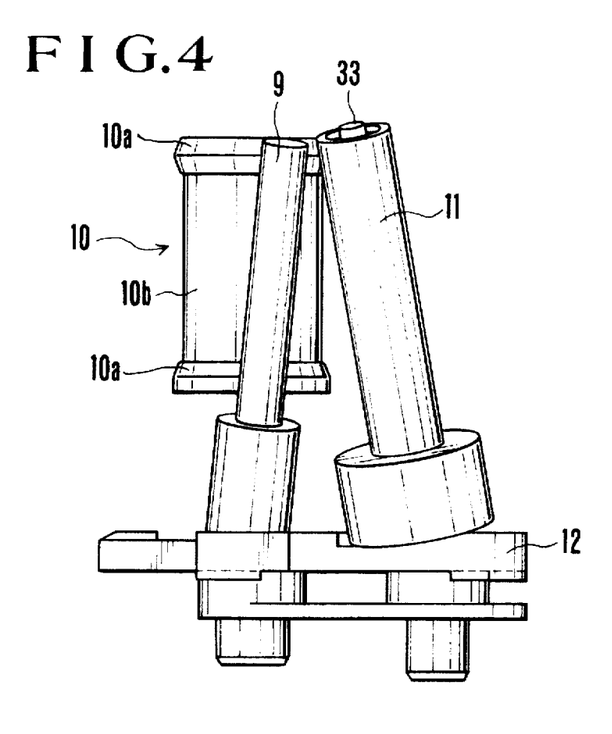
FIG. 4 is a side view of a skate on which an impedance roller is erected.

Each of the entrance-side and exit-side vertical posts 7 and 10 is provided with a flange part 10a which is arranged to restrict the widthwise movement of the tape 4 (see FIG. 4). Further, each of the vertical posts 7 and 10 is provided also with a guide part 10b which is in the form of a rotating roller and arranged to come into contact with the surface of the tape 4 (see FIG. 4). The impedance roller 11 is also in the form of a rotating roller. The entrance-side and exit-side slanting posts 6 and 9 are formed as stationary pins. A pinch roller 13 is provided for transmitting the rotation of a capstan 14 to the tape 4 when the tape 4 is traveling. The pinch roller 13 is carried by a shaft 16 which is erected on a pinch arm 15. The pinch arm 15 is arranged to be swingable on a shaft 17 which is erected on a pinch skate 32. The pinch skate 32 is movable in the directions of arrow L3. A vertical post 18 is erected also on the pinch skate 32. A tension post 19 and a vertical post 20 are respectively rotating rollers having flanges and are arranged to be movable respectively in the directions of arrows L4 and L5 by means of arms which are not shown.

Besides the above-stated members, vertical posts 21 and 22, a total width erasing head 23, an audio-and-CTL (control) erasing head 24, an audio-and-CTL recording/reproducing head 25, an audio monitor head 26, a vertical post 27, a capstan 14 and a take-up-side tension post 28 are erected on a chassis which is not shown. A tape path is formed by these posts. A catcher 29 is disposed on the entrance side and a catcher 30 on the exit side. Another catcher 31 is provided for the pinch skate 32. These catchers are arranged to position the entrance-side skate 8, the exit-side skate 12 and the pinch skate 32 by abutting on these skates upon completion of tape loading.

Figure 5:
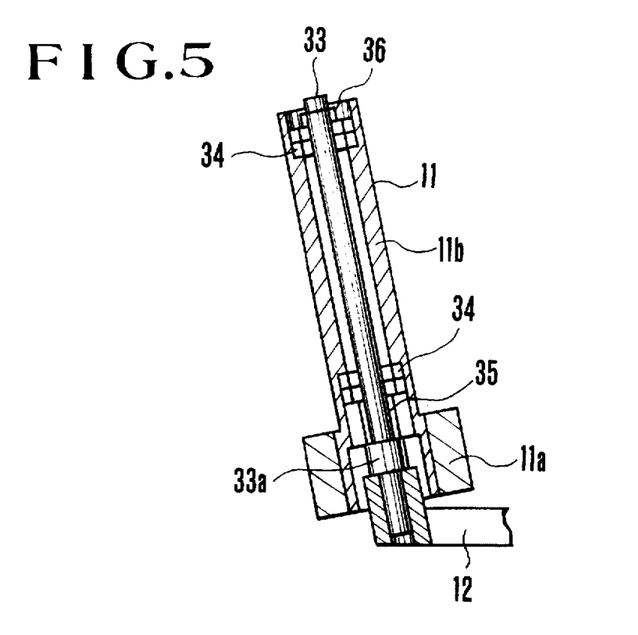
FIG. 5 is a sectional view showing the arrangement of the impedance roller.

The structural arrangement of the impedance roller 11 is described as follows: FIG. 4 is a left-side view of the exit-side skate 12. FIG. 5 is a sectional view of the impedance roller 11. The impedance roller 11 is carried via a bearing 34 by a shaft 33 which is press-fitted obliquely into the skate 12 at a given angle relative to a datum plane. A compression spring 35 which is disposed between the seat 33a and the lower bearing 34 of the shaft 33 is arranged to urge the impedance roller 11 to move upward. The height of the roller 11 is determined with the upward movement of the roller 11 restricted by an E ring 36. A pre-load is thus applied also to the bearing 34. Further, one end part 11a of the impedance roller 11 which is not coming into contact with the tape has a larger diameter than an upper part 11b of the roller 11. In addition to this, the weight of the impedance roller 11 is increased as much as possible by employing brass or the like as the material of the impedance roller 11.

Next, the movement of the posts in loading the tape is described as follows: in a loading standby state in which the cassette 1 is loaded as shown in FIG. 2, the vertical posts 7, 10, 18, 19 and 20, the slanting posts 6 and 9, the pinch roller 13 and the impedance roller 11 are located within an opening part 1a of the tape cassette 1. Upon detection of cassette loading, a loading motor which is not shown rotates to begin to move the tension post 19, the vertical post 20 and the skates 8, 12 and 32 in the direction of moving them away from the tape cassette 1. The tape 4 is then pulled out from the tape cassette 1. The tape 4 thus pulled out is wrapped around the drum 5 accordingly as the process of loading proceeds. The skates 8, 12 and 32 are positioned respectively by the catchers 29, 30 and 31 when the tape 4 is wrapped around the drum 5 to a given angle. The process of tape loading then comes to an end.

The members that come into contact with the tape 4 during the process of tape loading are the tension post 19, the vertical posts 7, 10, 18 and 20 and the slanting posts 6 and 9. The impedance roller 11 is arranged to come to abut on the tape 4 immediately before completion of the tape loading. Further, the impedance roller 11 is arranged to be disposed at such an angle as to abut on the tape 4 perpendicular to the traveling direction of the tape 4 when a tape path is formed.

In the case of this embodiment, as described in the foregoing, the impedance roller 11 is erected on the skate 12 which is disposed on the exit side of the drum 5. Therefore, the impedance roller 11 can be caused, by operating the exit-side skate 12, to come to abut on the tape 4 while moving from the cassette 1 toward the drum 5. The impedance roller 11 thus not only can be disposed very close to the drum 5 but also can be set in position by using a wide space.

The arrangement of the exit-side skate 12 of this embodiment is described in detail as follows with reference to FIGS. 6 and 7. These drawings show that, at the time of tape loading, the exit-side skate 12 is moved along a moving locus which is indicated by the arrow L2 from the opening part 1a of the tape cassette 1, as shown in FIG. 2, to be positioned by the exit-side catcher 30. Referring to these drawings, a slanting shaft 33 is arranged to rotatably carry the impedance roller 11. A vertical shaft 43 is arranged to rotatably carry the vertical post 10. Both the shafts 33 and 43 are press-fitted into the skate 12. These rotatory bodies are kept rotatable by means of bearings.

An arm-like post base 45 is arranged to fixedly hold the base part of the exit-side slanting post 9 while keeping the post 9 at a given angle of inclination. As shown in FIG. 7, the post base 45 is rotatably fitted on the medium diameter part 43a of the vertical shaft 43 and can be positioned by means of an adjustment screw 46. More specifically, the post base 45 has an adjustment hole 45a formed in the shape of a slot. The adjustment hole 45a allows the slanting post 9 to be slightly turned in the directions of arrow D as shown in FIG. 6. The slanting post 9, therefore, can be positioned by tightening the adjustment screw 46 after adjustment of its position in a manner as will be described later herein. A guide plate 47 is attached to the skate 12 along the reverse side of the skate 12. A bushing 48 which has a tap thread cut in the middle of it is secured by caulking to a part of the guide plate 47. The skate 12 is secured to the bushing 48 by a screw 50 in a state of holding, between the skate 12 and the guide plate 47, a rail 49 which determines the tape loading path indicated by the arrow L2.

Figure 6:
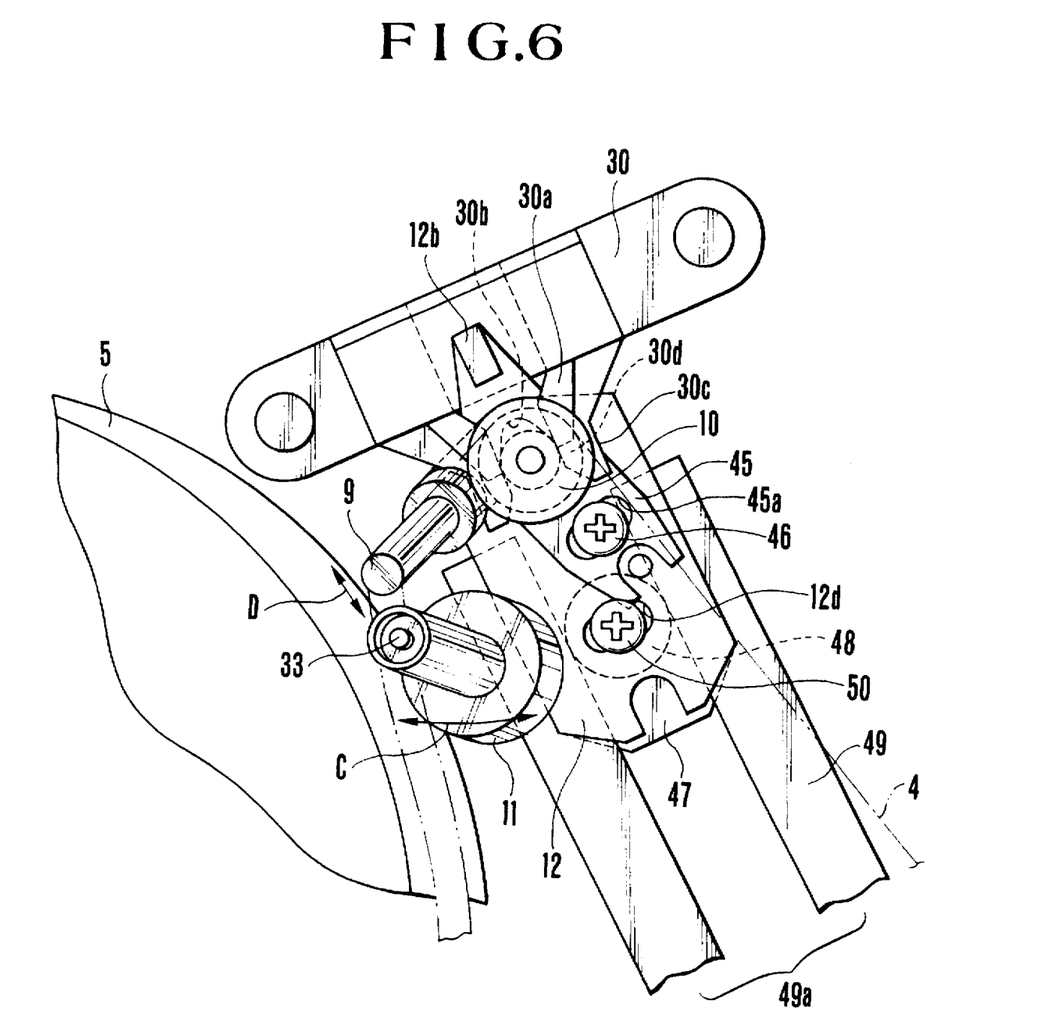
FIG. 6 is a plan view showing, by way of example and in a loading state, the arrangement of the movable members shown in FIG. 3.
Figure 7:
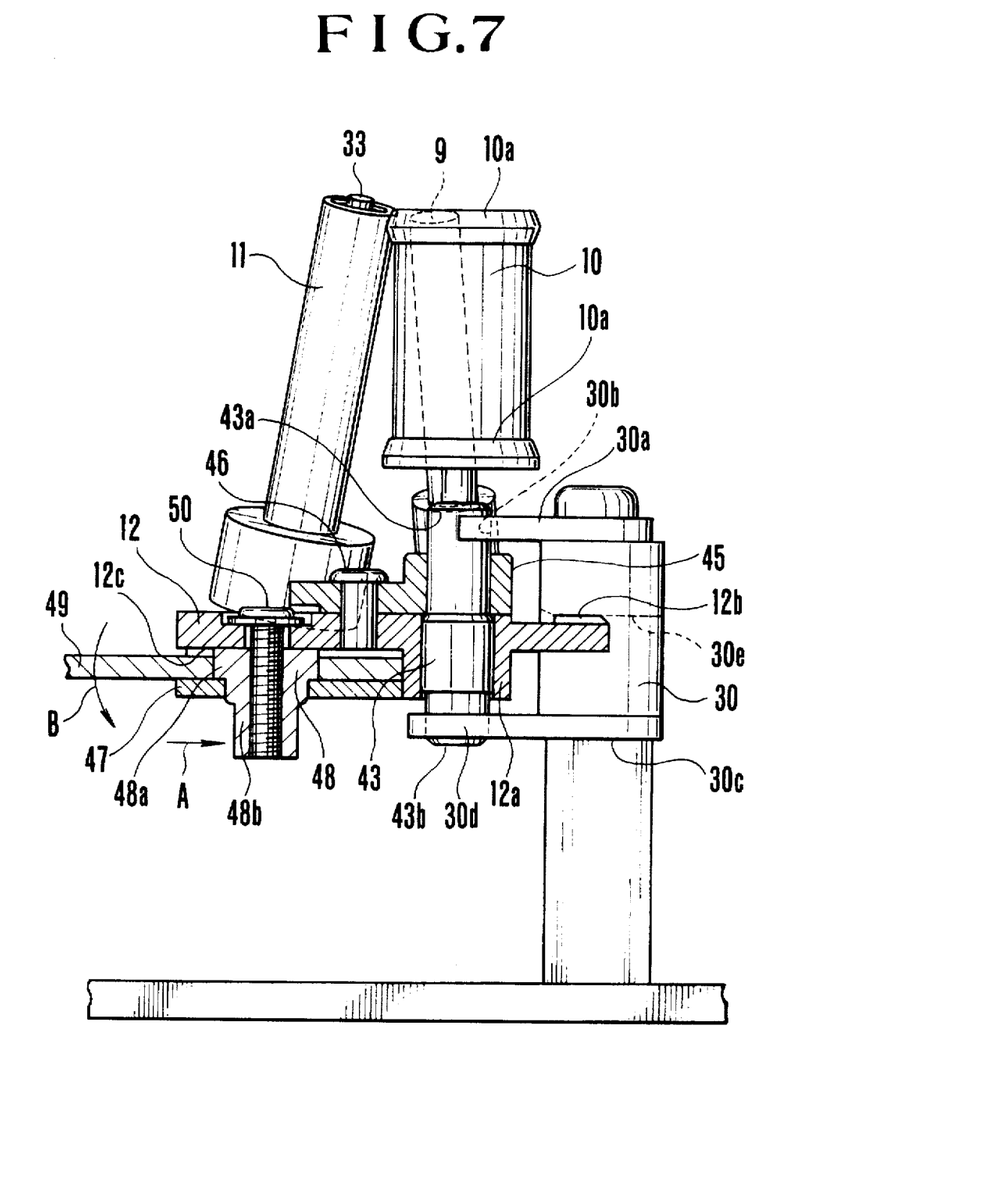
FIG. 7 is a partly sectional side view showing, by way of example and in a loading state, the arrangement of the the movable members shown in FIG. 3.

A positioning process which is to be performed upon completion of tape loading is described as follows:

During the tape loading action, the guide part 12a of the skate 12 and the guide part 48a of the bushing 48 move along the groove part 49a of the rail 49 in a state of being fitted in the groove part 49a as shown in FIG. 6. Upon completion of the tape loading action, the upper part of the medium diameter part 43a of the vertical shaft 43 abuts on a V (V-shaped) groove 30b which is provided in the upper arm 30a of the catcher 30. Further, the lower part 43b of the vertical shaft 43 is guided by a parallel groove 30d which is provided in the lower arm 30c of the catcher 30. The skate 12 is thus first set in its position. At this time, a downward protruding part 48b of the bushing 48 which is shown in FIG. 7 is urged in the direction of arrow A by an arm which is not shown. Therefore, with the vertical shaft 43 abutting on the V groove 30b of the catcher 30, this urging force causes the skate 12 to receive a moment which is exerted to turn the skate 12 on the abutting position in the direction of arrow B. As a result, the fore end part 12b of the skate 12 abuts on the upper face 30e of an engaging groove formed in the catcher 30 while the bottom face 12c of the skate 12 is pushed against the rail 49. The angle of decline of the skate 12 is thus defined along with its position. Further, the screw mounting hole 12d of the skate 12 is formed in the shape of a slot. After completion of tape loading, this hole 12d allows the skate 12 to be turned to a given degree of angle on the vertical shaft 43 which abuts on the V groove 30b of the catcher 30.

With the tape loading arrangement formed in this manner, adjustment procedures relative to the skate 12 for the travel of the tape are described as follows:

The impedance roller 11 is a post located in a first position among others on the exit side of the rotary drum 5. Therefore, the angle at which the tape 4 is wrapped around the rotary drum 5 is determined by the position of the impedance roller 11. The skate 12 is first turned in the direction of arrow C as shown in FIG. 6 with the screw 50 loosened. When a given tape wrapping angle is found to have been obtained by watching the output of a reference tape, the skate 12 is fixed by the screw 50. Next, the adjustment screw 46 is loosened. The post base 45 is turned in the direction of arrow D to change the orientation or direction of the slanting post 9. Then, the way in which tension is applied to the tape 4 and the distribution of the tension can be adjusted by changing the way in which the slanting post 9 comes into contact with the tape 4. This adjustment is made also by watching the output of the reference tape. The adjustment screw 46 is fixed at a point where the output of the reference tape reaches a maximum value. In the last place, the height of the vertical post 10 is adjusted through the mounting part (not shown) of the vertical shaft 43 to which the post 10 is secured. The post 10 is then fixed in a position where the tape 4 comes to extend along the lead (not shown) of the rotary drum 5. Further, adjustment on the entrance side of the rotary drum 5 may be made by adjusting and changing the height of the vertical post 7 and the orientation or direction of the slanting post 6 in accordance with the M loading method which is employed in general.

The embodiment described is arranged to have the impedance roller 11 disposed between the rotary drum 5 and the exit-side slanting post 9. However, this arrangement may be changed to have the impedance roller 11 erected on the skate 8 on the entrance side and disposed between the rotary drum 5 and the entrance-side slanting post 6. It is also possible to have impedance rollers arranged on both the exit and entrance sides of the rotary drum 5.

While the impedance roller 11 is erected on the exit-side skate 12 for the purpose of reducing the number of parts, the impedance roller 11 may be erected on some other member and interlocked with the operation of the exit-side skate 12.

Further, this embodiment is arranged to move the impedance roller 11 in association with the movement of the exit-side skate 12. That arrangement, however, may be changed to arrange the impedance roller 11 in a prostrate state on the chassis near to the rotary drum 5 and to do the required action by lifting the roller 11 from the prostrate state in association with the process of positioning the exit-side skate 12.

While this embodiment has been described with regard to the so-called M loading method, the invented arrangement of the impedance roller described is of course applicable to other tape loading methods.

As described in the foregoing, the embodiment is arranged to bring the impedance roller into contact with the tape from inside of the tape path upon completion of tape loading. This arrangement permits effective use of such a space that has heretofore been left as a dead space, so that the mass of the impedance roller can be increased without increasing the size of the apparatus.

Further, the impedance roller is arranged to be located between the rotary drum and at least one of the posts located immediately before and immediately after the rotary drum in the tape path. Therefore, the impedance roller having a sufficiently large mass can be disposed sufficiently close to the rotary drum.

Since the impedance roller is arranged to be moved to a predetermined position in association with the tape loading action, the tape loading action can be performed without being hindered by the impedance roller. Further, since the impedance roller is erected on a skate on which a slanting post is erected, the object of the invention can be attained without increasing the number of parts.

Further, with a plurality of slanting posts arranged on the movable member, there is provided a means for individually adjusting the slanting direction or position of the plurality of slanting posts. Therefore, the way in which the impedance roller abuts on the tape and the way in which the tape comes to the drum can be independently controlled and adjusted. The embodiment thus permits adjustment work on the traveling path of the tape to be methodically and smoothly accomplished.

What is claimed is:

1. A recording and/or reproducing apparatus for recording or reproducing information by wrapping a tape-shaped recording medium around a rotary drum which is provided with heads, comprising:

a) a capstan arranged to cause the recording medium to travel at a constant speed in cooperation with a pinch roller; and b) loading means for wrapping the recording medium around the rotary drum, said loading means including:

slanting posts arranged to be located on entrance and exit sides of the rotary drum upon completion of loading the recording medium; and an impedance roller arranged to move with the loading means and to suppress vibrations occurring in the recording medium wrapped around the rotary drum and to slant, said impedance roller, being located at the closest position between the rotary drum and at least one of the slanting posts on at least one of the entrance and exit sides upon completion of loading the recording medium, said impedance roller abutting on the recording medium from inside of the path of the recording medium upon completion of loading the recording medium, wherein said impedance roller and the at least one of the slanting posts are arranged to be individually adjustable on a common moving member during loading of the recording medium.

2. An apparatus according to claim 1, wherein said impedance roller and the at least one of the slanting posts which is adjoining the impedance roller are disposed on the common moving member and are arranged to move together in loading the recording medium.

3. An apparatus according to claim 2, wherein said impedance roller and the at least one of the slanting posts are arranged such that their slanting directions and positions are individually adjustable on said moving member.

4. An apparatus according to claim 3, wherein a shaft carrying said impedance roller is arranged aslant.

5. An apparatus according to claim 2, further comprising a guide member which is arranged on said moving member to guide the recording medium.

6. An apparatus according to claim 5, wherein said guide member is arranged perpendicularly to a base part of the apparatus.

7. An apparatus according to claim 1, wherein said impedance roller has a small diameter part which is arranged to abut on the recording medium and a large diameter part which is located below the small diameter part.

8. An apparatus according to claim 7, wherein said impedance roller is made of brass.

9. A recording and/or reproducing apparatus for recording or reproducing information by pulling out a tape-shaped recording medium which is stowed in a cassette and by wrapping the tape-shaped recording medium around a rotary drum which is provided with heads, comprising:

a) a stationary chassis;

b) a movable chassis arranged to allow the cassette to be placed thereon and to be movable over said stationary chassis;

c) loading means arranged to move together with said movable chassis and to wrap the recording medium around the rotary drum, said loading means including:

slanting posts arranged to be located on entrance and exit sides of the rotary drum upon completion of loading the recording medium; and an impedance roller arranged to move with the loading means and to suppress vibrations occurring in the recording medium wrapped around the rotary drum and to slant, said impedance roller, being located at the closest position between the rotary drum and at least one of the slanting posts on at least one to the entrance and exit sides upon completion of loading the recording medium, said impedance roller abutting on the recording medium from inside of the path of the recording medium upon completion of loading the recording medium, wherein said impedance roller and the at least one of the slanting posts are arranged to be individually adjustable on a common moving member during loading of the recording medium.

10. An apparatus according to claim 9, wherein said impedance roller and the at least one of the slanting posts adjoining the impedance roller are disposed on the common moving member and are arranged to move together in loading the recording medium.

11. An apparatus according to claim 10, wherein said impedance roller and the at least one of the slanting posts are arranged such that their slanting directions and positions are individually adjustable on said moving member.

12. An apparatus according to claim 11, wherein a shaft carrying said impedance roller is arranged aslant.

13. A tape pull-out device for wrapping a tape around a rotary drum by pulling the tape out from a cassette in which the tape is stowed, comprising:

a) a plurality of guide members arranged to pull the tape out from the cassette; and b) an impedance roller arranged to move with the tape pull-out device and to suppress vibrations occurring in the tape wrapped around the rotary drum and to slant, said impedance roller being located, upon-completion of wrapping the tape, at the closest position between the rotary drum and at least one of said plurality of guide members and the impedance roller, said impedance roller abutting on the tape from inside of the path of the tape upon completion of loading the tape, wherein said impedance roller and the at least one of the plurality of guide members are arranged to be individually adjustable on a common moving member during loading of the tape.

14. A device according to claim 13, wherein said impedance roller and the at least one of said plurality of guide members are disposed on the common moving member and are arranged to move together when the tape is pulled out.

15. A device according to claim 14, wherein a shaft by which said impedance roller is carried and the at least one of said plurality of guide members are arranged aslant.

16. A device according to claim 15, wherein said impedance roller and the at least one of said plurality of guide members are arranged such that their slanting directions and positions are individually adjustable on said moving member.

17. A recording and/or reproducing apparatus for recording or reproducing information by wrapping a tape-shaped recording medium around a rotary drum which is provided with heads, comprising:

an impedance roller arranged to move with loading means of the recording and/or reproducing apparatus and to suppress vibrations occurring in the tape-shaped recording medium wrapped around the rotary drum, to slant and to abut on the recording medium from inside of a tape path upon completion of loading the recording medium on the rotary drum, said impedance roller being located, upon completion of loading the recording medium, at the closest position between the rotary drum and the slanting post in said tape path, wherein said impedance roller and a slanting post are arranged to be individually adjustable on a skate during loading of the recording medium.

18. An apparatus according to claim 17, wherein said impedance roller is arranged to move, during the process of loading the recording medium, in association with a loading action performed on the recording medium.

19. An apparatus according to claim 18, wherein said impedance roller is erected on the skate together with the slanting post which is provided for wrapping the recording medium around the rotary drum, said impedance roller being arranged to take a predetermined position by moving with said skate in loading the recording medium.

20. A recording and/or reproducing apparatus for recording or reproducing information by wrapping a tape-shaped recording medium around a rotary drum which is provided with heads, comprising:

a) a plurality of posts arranged to form a tape path in wrapping the tape-shaped recording medium around the rotary drum, said posts including a slanting post and an impedance roller;

b) a movable member arranged to movably carry at least the slanting post and the impedance roller; and c) adjustment parts arranged to permit individual adjustment of the positions of the slanting post and the impedance roller disposed on the movable member, said impedance roller arranged to move with the movable member and to suppress vibrations occurring in the recording medium wrapped around the rotary drum and to slant, said impedance roller, being located at the closest position between the rotary drum and the slanting post upon completion of loading the recording medium, said impedance roller abutting on the recording medium from inside of the path of the recording medium upon completion of loading the recording medium.

21. An apparatus according to claim 20, wherein said impedance roller is carried by a slanting shaft.

22. An apparatus according to claim 20, wherein said posts carried by the movable member include two slanting posts.

* * * * *

UNITED STATES PATENT AND TRADEMARK OFFICE
CERTIFICATE OF CORRECTION

PATENT NO. : 5,760,994
DATED : June 2, 1998
INVENTOR(S) : Takashi Kimura

It is certified that error appears in the above-identified patent and that said Letters Patent is hereby corrected as shown below:

Col. 3, line 26, delete "exist" and insert -- exit --.

Signed and Sealed this

Twelfth Day of January, 1999

Attest:

*Attesting Officer*   *Acting Commissioner of Patents and Trademarks*